Aug. 25, 1925.
B. H. PRATT
FAN BELT
Filed April 18, 1924
1,550,983
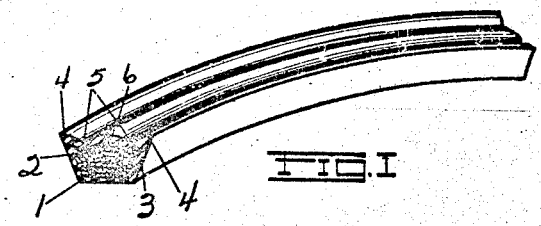
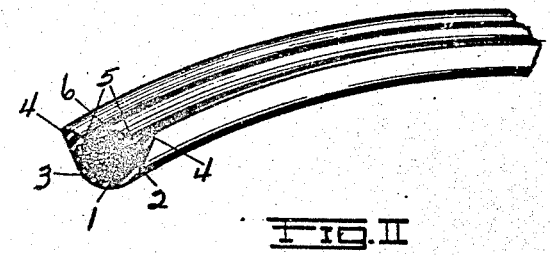
BENJIMAN H. PRATT
INVENTOR
ATTORNEY Patented Aug. 25, 1925.

1,550,983

UNITED STATES PATENT OFFICE.

BENJAMIN H. PRATT, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

FAN BELT.

Application filed April 18, 1924. Serial No. 707,398.

*To all whom it may concern:*

Be it known that I, BENJAMIN H. PRATT a citizen of the United States, and a resident of Milwaukee, in the county of Milwaukee and State of Wisconsin, have invented certain new and useful Improvements in Fan Belts, of which the following is a specification.

My invention relates to an improvement in fan belts, particularly that type known as a V belt.

Belts of this type have been made of rubberized fabric, either cord or square woven, or a combination of both. Such belts however have the fabric substantially uniformly distributed throughout their cross section and for that reason are subject to undesirable strains when the belt turns around the pulley and exposure of the fabric.

It is the object of my invention to provide a construction which will absorb the working strains without damage to the fabric.

In the accompanying drawing showing one embodiment of my invention—

Figure 1 represents a fragment of a belt in perspective.

Figure 2 is a similar view of a modification.

In the drawings 1 represents the core of the belt, preferably composed of bias cut rubberized cord fabric, rolled upon itself, and 2 shows a covering of square woven bias cut rubberized fabric rolled about the core. At 3 is shown an outer covering of rubber which is rolled about the fabric covering. The so formed belt is molded to a cross section, shown in Figure 1, providing a flat base and diverging sides while the top is formed with curving depressions 5 meeting the sides of the belt to form relatively sharp thin laterally projecting ears or wings 4, and meeting at the center to form a rounded stiffening rib 6. In the molding operation the rubber covering flows outwardly toward the edges so that the ears 4 and rib 6 in the completed belt are formed of rubber and readily yield when the outer periphery of the belt is subjected to tensile strain in rounding the pulley without exposing the fabric covering the core, which latter therefore absorbs its share of such strain without deterioration and with a graduated transition from the excessive yielding of the ears 4.

The depressions 5 permit the outer periphery of the belt to yield transversely if necessary to accommodate variations in the size of the pulley groove and rib 6 is provided to stiffen the periphery against excessive transverse strain and to absorb or transfer the tensile strains at the center of the outer periphery.

Figure 2 shows a slightly modified form of my V belt in which the base is rounded, the structure otherwise being the same.

Having described the preferred form of my improved belt I claim as my invention:

An endless V type belt comprising a core of cord fabric, a square woven fabric covering about said core, an outer covering of relatively soft rubber, the outer periphery of said belt being provided with longitudinal curved depressions forming tapering yielding ears at the outer peripheral edges, and a rounded reinforcing rib between said ears.

In testimony whereof I have signed my name to the above specification.

BENJAMIN H. PRATT.